(12) United States Patent　(10) Patent No.: US 8,418,477 B2
Klein et al.　(45) Date of Patent: Apr. 16, 2013

(54) SOLAR-THERMOELECTRIC AIR-CONDITIONING IN VEHICLES

(75) Inventors: Richard Klein, Palo Alto, CA (US); Bhagavathi P. Natarajan, Jersey City, NJ (US)

(73) Assignee: Quixotic Systems, Inc., New York, NY (US)

( * ) Notice: Subject to any disclaimer, the term of this patent is extended or adjusted under 35 U.S.C. 154(b) by 973 days.

(21) Appl. No.: 12/369,562

(22) Filed: Feb. 11, 2009

(65) Prior Publication Data

US 2009/0199572 A1　Aug. 13, 2009

Related U.S. Application Data

(60) Provisional application No. 61/028,063, filed on Feb. 12, 2008.

(51) Int. Cl.
*F25B 21/02*　(2006.01)

(52) U.S. Cl.
USPC ...... 62/3.61; 62/3.1; 62/3.2; 62/3.6; 62/235.1

(58) Field of Classification Search ............ 62/3.1, 62/3.2, 3.6, 3.61, 235.1
See application file for complete search history.

(56) References Cited

U.S. PATENT DOCUMENTS

| | | | | |
|---|---|---|---|---|
| 4,955,203 A | * | 9/1990 | Sundhar | 62/3.61 |
| 6,662,572 B1 | * | 12/2003 | Howard | 62/3.61 |
| 2002/0026797 A1 | * | 3/2002 | Sundhar | 62/3.2 |

FOREIGN PATENT DOCUMENTS

| | | | | |
|---|---|---|---|---|
| GB | 2241378 A | * | 8/1991 | |
| JP | 2002115926 A | * | 4/2002 | |

* cited by examiner

*Primary Examiner* — Cheryl J Tyler
*Assistant Examiner* — Jonathan Bradford
(74) *Attorney, Agent, or Firm* — Tech Valley Patent, LLC

(57) ABSTRACT

An apparatus for providing air-conditioning to a vehicle is disclosed. The apparatus includes a solar photovoltaic panel positioned in a window or windshield to provide direct current to power a thermoelectric assembly to pump excess heat out of the interior of the car. The car is air-conditioned in a parked state and pre-air-conditioned before use.

29 Claims, 5 Drawing Sheets

SOLAR-THERMOELECTRIC AIR-CONDITIONING IN VEHICLES

CROSS-REFERENCE TO RELATED APPLICATIONS

This application claims the benefit of U.S. Ser. No. 61/028,063 filed Feb. 12, 2008, which application is fully incorporated herein by reference.

BACKGROUND OF THE INVENTION

1. Field of the Invention

The present invention relates generally to thermoelectric cooling, and more particularly to a system and its methods of use for cooling an interior of a vehicle by using a thermoelectric cooling assembly powered a solar photo-voltaic panel.

2. Description of the Related Art

Interior compartments of stationary vehicles tend to get enormously hot particularly during sunny, daylight periods of the day. On a warm sunny day, for example, a vehicle's windows collect light, trapping heat inside the vehicle and pushing the temperature inside to dangerous levels (100-130° F.). Such temperature increases can occur in a car even if the windows are opened slightly. An extremely hot interior of a vehicle poses a danger to pets, electronics and heat-sensitive items, such as medications, left in the vehicle, such as a car. An extremely hot stationary vehicle interior increases the cooling load on the vehicle air-conditioning unit when the vehicle is operated.

An existing method in cars to passively prevent this heating problem involves aluminum-coated reflectors mounted on the windshields of the parked cars which reflect the sun's incoming radiation. This technique is not effective because these reflectors are not so efficient in preventing the sun's radiation from entering the car and eventually the temperature inside the car becomes undesirable.

A thermoelectric cooler (TEC), also known as a thermoelectric module or Peltier cooler, is a semiconductor-based electronic component that functions as a small heat pump. By applying a low voltage DC power source to a TEC, heat will be moved through the thermoelectric material from one side to the other. One cooler face, the cold side, therefore is cooled while the opposite face, the hot side, is simultaneously heated.

FIG. 1 is a diagram of a practical TEC 101 comprising two or more elements of p-type and n-type semiconductor material P and N that are connected electrically in series and thermally in parallel. The semiconductor material is generally bismuth telluride. The elements of semiconductor material P and N are biased by a low DC voltage provided by a DC power source 102. These thermoelectric elements and their electrical interconnects typically are mounted between two ceramic substrates 103 and 104. One ceramic substrate is the cold side 103 removing heat from an object being cooled 105. The object being cooled 105 may, in turn, be used to remove heat from another object or air. A heat sink 106 must remove from the other ceramic substrate, the hot side 104. In turn, heat must be removed from the heat sink 106. The heat sink may have fins fabricated into to enhance the exchange of heat between it and air and/or water. Placing TEC's on top of one another in stages to form a multi-stage thermoelectric module increases cooling performance.

Like mechanical refrigerators, TEC's are governed by the same fundamental laws of thermodynamics. In a mechanical refrigeration unit, a compressor raises the pressure of a liquid and circulates the refrigerant through the system. In the evaporator or "freezer" area, the refrigerant boils and in the process of changing to a vapor, the refrigerant absorbs heat causing the freezer to become cold. The heat absorbed in the freezer area is moved to the condenser where it is transferred to the environment from the condensing refrigerant.

In a thermoelectric cooling system, a doped semiconductor material essentially takes the place of the liquid refrigerant, the condenser is replaced by a heat sink 106, and the compressor is replaced by a DC power source 102. The heat sink 106 may be fabricated with fins to exchange heat from the heat sink 106 with surrounding air. The application of DC voltage to the thermoelectric module causes electrons to move through the semiconductor material. At the cold side 103, heat is absorbed by the electron movement, moved through the semiconductor material P and N, and expelled at the hot side 104.

It should be noted that thermoelectric modules can only transfer heat from the cold side 103 to the hot side 104, but cannot dissipate heat by themselves into the atmosphere. Hence, heat sinks must be in contact at the hot side 104 of the thermoelectric module to dissipate heat to the atmosphere through convection. Applications for thermoelectric modules cover a wide spectrum of product areas. These include equipment used by the military, medical, industrial, consumer, scientific and telecommunication organizations. Uses range from simple food and beverage coolers for an afternoon picnic to extremely sophisticated temperature control systems in missiles and space vehicles. Some of the more significant features of thermoelectric modules include: no moving parts, small size, ability to cool below ambient as well as heat above ambient, reliability and environmental friendliness.

FIG. 2 is a diagram of the top view of a small enclosure 200 air-conditioned by the thermoelectric effect. An air-to-air heat exchanger 201 is used for the cooling of air in an enclosure. The air-to-air heat exchanger 201 utilizes the thermoelectric effect whereby the heat is transferred via the flow of current through thermoelectric modules 202. One part absorbs the heat and, as a consequence, reduces the temperature on the cold side 203 and the other part dissipates the heat to ambient on the hot side 204.

Fans 205 and 206 are used to move air over heat sinks 207 and 208 on both the hot and cold sides of the thermoelectric modules. The cold side 203 of the modules 202 is connected to a heat sink 207 with a fan 205 (forced convection) that absorbs heat from within the enclosure 200 and circulates the cooled air. The hot side 204 of the thermoelectric modules 201 is connected to another forced convection heat sink 208 that dissipates the heat absorbed through the cold side 203 to the atmosphere. Forced convection improves the cooling performance. In FIG. 2, the thermoelectric modules 201 form the active cooling element and the fans 205 and 206 in combination with the respective heat sinks 207 and 208 form the passive cooling elements.

U.S. Pat. No. 6,119,463 describes a thermoelectric cooling system that cools seats by thermoelectric cooling air supplied to passages inside the surface of a seat. The heat is removed from the hot side of the TECs by a heat exchanger cooled by air passing over it and into the interior compartment of the vehicle. Thus, this apparatus cools the seat surface but heats the air in the interior of the vehicle.

Solar photovoltaic panels have been permanently constructed into vehicles. In land vehicles, such as cars and trucks, these panels have been built in the sun roof to supplement electric power for various applications in the vehicle. Some of these applications can operate without use of electric power provided by the vehicle's engine.

Permanently installed, solar photovoltaic panel-powered thermoelectric cooling systems have been developed for cars. Thermoelectric car air-conditioning has been previously described. Japanese Patent Application Publication No. 08-011517 discloses a built-in thermoelectric air-conditioning apparatus for a car powered by the battery, in turn, powered by the engine or, alternatively, a solar panel installed on top of the roof. However, this apparatus must be factory-installed for new cars or retrofit, at significant expense, in existing cars. Because the apparatus sticks out of the floor of the car, it is intrusive to the driver and/or passenger.

Additionally, Japanese Patent Application Publication No. 11-342731 discloses solar photovoltaic panel-powered thermoelectric cooling system. However, this system must also be factory-installed for new cars or retrofitted, at significant expense, in existing cars. Additionally, in a parked state, the hot sides of the TEC's are inefficiently passively cooled by external air flowing in a narrow passage between roof of the car where the TEC's are installed and the bottom of the solar photovoltaic panel. The apparatus sticks out of the roof of the passenger automobile such that the aerodynamics, stability and structural integrity of the car are compromised.

Accordingly, there is a need for a need for a compact, removable apparatus to prevent the temperature inside a vehicle from becoming dangerously high during stationary periods in sunny conditions without requiring an expensive retrofitting of existing vehicles, compromising the structures of vehicles, or using the battery of the vehicle.

SUMMARY OF THE INVENTION

An object of the present invention is to provide an improved system, and its methods of use, for cooling the interior of a vehicle.

Another object of the present invention is to provide a compact and removable apparatus for cooling the interior of a vehicle.

Yet another object of the present invention is to provide a system, and its methods of use, for cooling an interior of a vehicle using a thermoelectric cooling assembly powered by a solar photo-voltaic panel without retrofitting the vehicle.

A further object of the present invention is to provide a system, and its methods of use, for cooling an interior of a vehicle using a thermoelectric cooling assembly powered by a low DC voltage from the solar photo-voltaic panel.

Yet another object of the present invention is to provide a system, and its methods of use, for cooling an interior of a vehicle using a thermoelectric cooling assembly powered by a low DC voltage from the solar photo-voltaic panel, wherein a direction of heat flow is controlled by a direction of the DC voltage applied to the TEC inside the thermoelectric cooling assembly.

These and other objects of the present invention are achieved in an apparatus for cooling the interior of a vehicle. A solar photo-voltaic panel is removably mounted on an inside of a window or a windshield of the vehicle. The solar photo-voltaic panel is mounted to block at least a portion of sun rays from entering the vehicle and configured to convert energy from the sun's rays to generate a DC voltage. A thermoelectric cooling assembly is powered by the low DC voltage from the removably mounted solar photo-voltaic panel.

In another embodiment of the present invention, an apparatus for cooling the interior of a vehicle includes a solar photo-voltaic panel removably mounted on an inside of a window or a windshield of the vehicle. The solar photo-voltaic panel is mounted to block at least a portion of sun rays from entering the vehicle and configured to convert energy from the sun's rays to generate a DC voltage. A thermoelectric cooling assembly is powered by the low DC voltage from the removably mounted solar photo-voltaic panel. Heat is transferred from air in the interior of the vehicle to an exterior of the vehicle through the thermoelectric cooling assembly.

In another embodiment of the present invention, an apparatus is provided for cooling the interior of a vehicle. A solar photo-voltaic panel is mounted on an inside of a window or a windshield of the vehicle. The solar photo-voltaic panel is mounted to block at least a portion of sun rays from entering the vehicle and configured to convert energy from the sun's rays to generate a DC voltage. A thermoelectric cooling assembly is included that is powered by the low DC voltage from the solar photo-voltaic panel. Heat is transferred from air in the interior of the vehicle to the exterior of vehicle through the thermoelectric cooling assembly. The thermoelectric cooling assembly includes a TEC. A direction of heat flow is controlled by a direction of the DC voltage applied to the TEC inside the thermoelectric cooling assembly.

In another embodiment of the present invention, a method is provided for cooling an interior of a vehicle. A solar photo-voltaic panel is mounted on an inside of a window or a windshield of the vehicle. The solar photo-voltaic panel is coupled to a thermoelectric cooling assembly that includes a TEC. The solar photo-voltaic panel is used to block at least a portion of sun rays from entering the vehicle. Energy from the sun's rays is converted to generate a DC voltage. At least a portion of the thermoelectric cooling assembly is powered by the low DC voltage.

In another embodiment, a method is provided for cooling an interior of a vehicle. A solar photo-voltaic panel is mounted on an inside of a window or windshield of the vehicle. The interior of the vehicle is thermoelectrically cooled using a thermoelectric cooling assembly powered by a low DC voltage from the solar photo-voltaic panel. The thermoelectric cooling assembly includes, a TEC with a cold side and a hot side, an internal heat sink in thermal contact with the cold side and in thermal contact with air in the interior of the vehicle on another side of the internal heat sink and an external heat sink in thermal contact with the hot side and in thermal contact with air in the exterior of the vehicle on another side of the external heat sink. The cold side of the TEC is sued to remove heat. Heat is transferred to the hot side of the TEC. The external heat sink is used to remove heat from the hot side of the TEC to an exterior of the vehicle.

DETAILED DESCRIPTION

In one embodiment of the present invention, an apparatus and associated methods are provided for cooling an interior of a vehicle. Suitable vehicles include but are not limited to cars, trucks, trailers, planes, boats and the like. In one embodiment, the cooling apparatus is a thermoelectric cooling assembly powered by a low DC voltage from a removably mounted solar photo-voltaic panel, as more fully described herein. "Low" is of a sufficient amount to provide the necessary power. The amount of DC voltage is dependent on the internal temperature conditions found inside the vehicle.

In one embodiment, a solar photo-voltaic panel is removably mounted on the inside of a window or a windshield of the vehicle. The apparatus also includes a thermoelectric cooling assembly powered by a low DC voltage from the removably mounted solar photo-voltaic panel. The thermoelectric cooling assembly can be a TEC with a cold side from which heat is removed and a hot side where heat is transferred. The thermoelectric cooling assembly can include an internal heat sink in fixed, thermal contact with the cold side on one side of the internal heat sink and in thermal contact with air in the interior of the vehicle on another side of the internal heat sink.

In one embodiment, the thermoelectric cooling assembly includes an external heat sink in a fixed, thermal contact relationship with the hot side on one side of the external heat sink. In this embodiment, the external heat sink is in thermal contact with air or water exterior to the vehicle on another side of the external heat sink.

In another embodiment of the present invention, a method is provided for cooling the interior of a vehicle. A solar photo-voltaic panel is mounted on the inside of a window or windshield of the vehicle. A thermoelectric cooling assembly is used to cool the interior of the vehicle. The thermoelectric cooling assembly is powered by a low DC voltage from the removably mounted solar photo-voltaic panel. The thermoelectric cooling assembly can include a TEC with a cold side from which heat is removed, and a hot side to which heat is transferred. The thermoelectric cooling assembly can also include an internal heat sink in a fixed, thermal contact with the cold side on one side of the internal heat sink and in thermal contact with air in the interior of the vehicle on another side of the internal heat sink. The thermoelectric cooling assembly can include an external heat sink in a fixed, thermal contact with the hot side on one side of the external heat sink and in thermal contact with air in the exterior of the vehicle on another side of the external heat sink.

Figure 1:
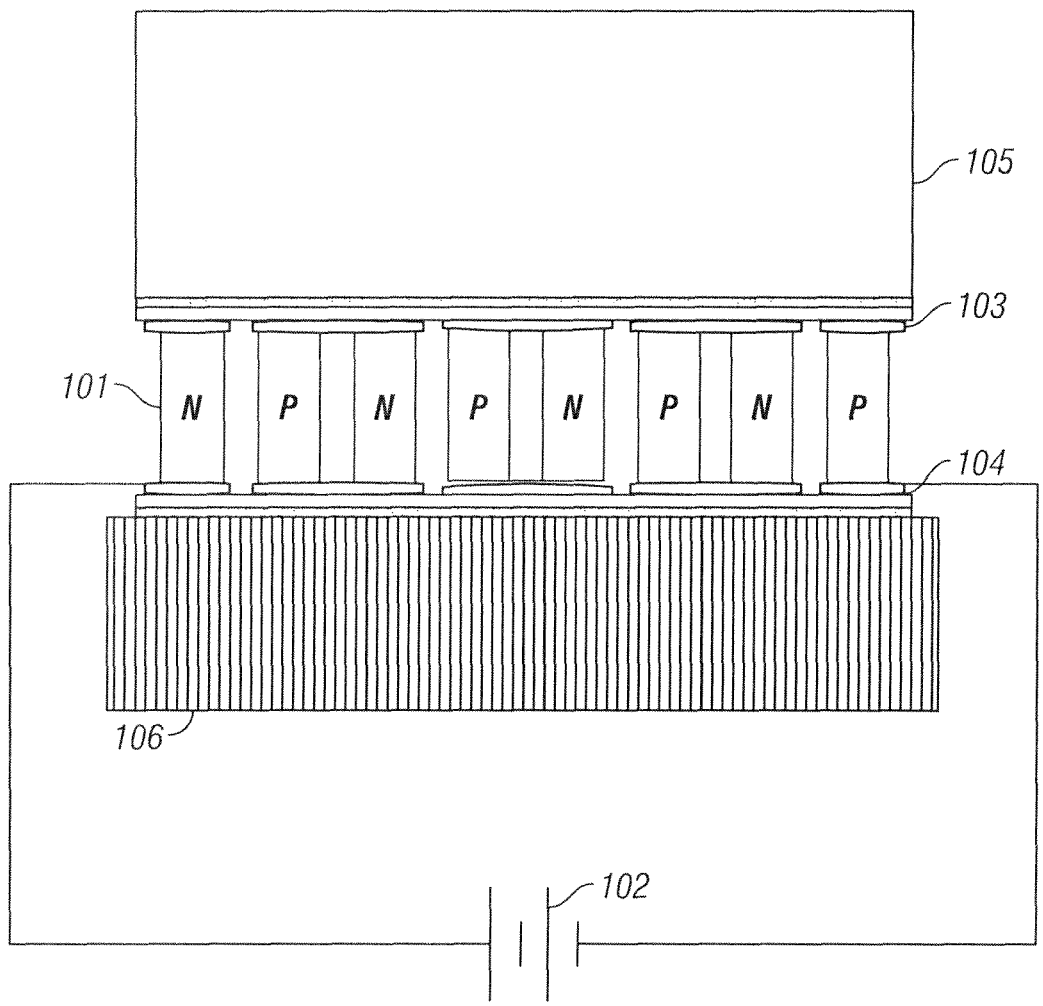
FIG. 1 is a diagram of a practical TEC comprising two or more elements of p-type and n-type semiconductor material that are connected electrically in series and thermally in parallel.
Figure 2:
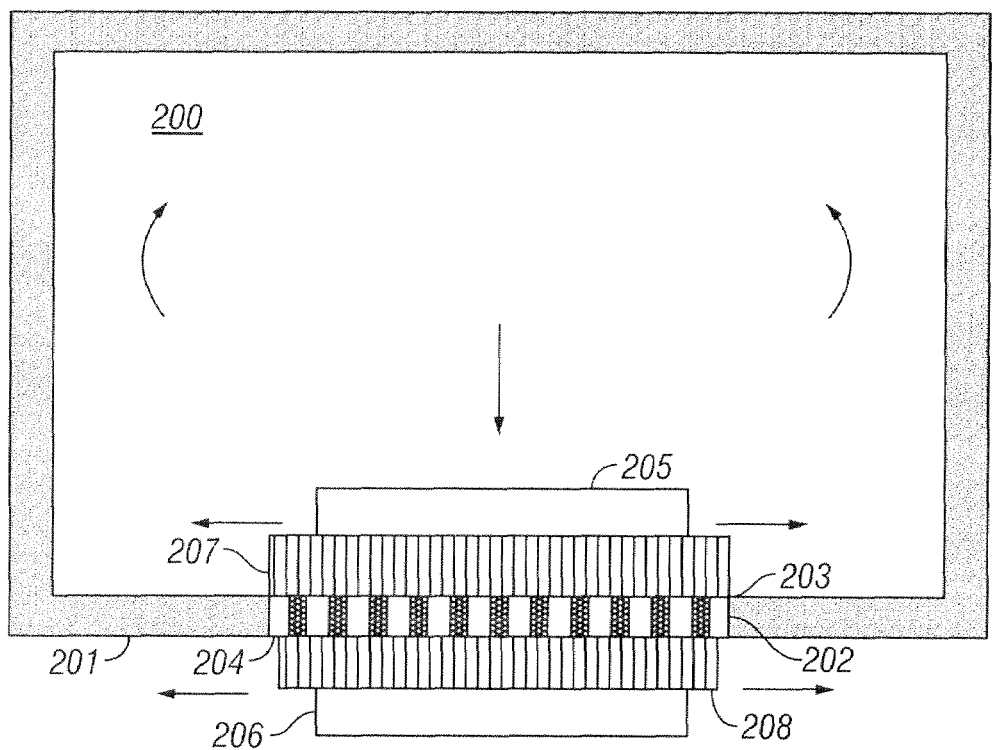
FIG. 2 is a diagram of the top view of a small enclosure air-conditioned by the thermoelectric effect.
Figure 3:
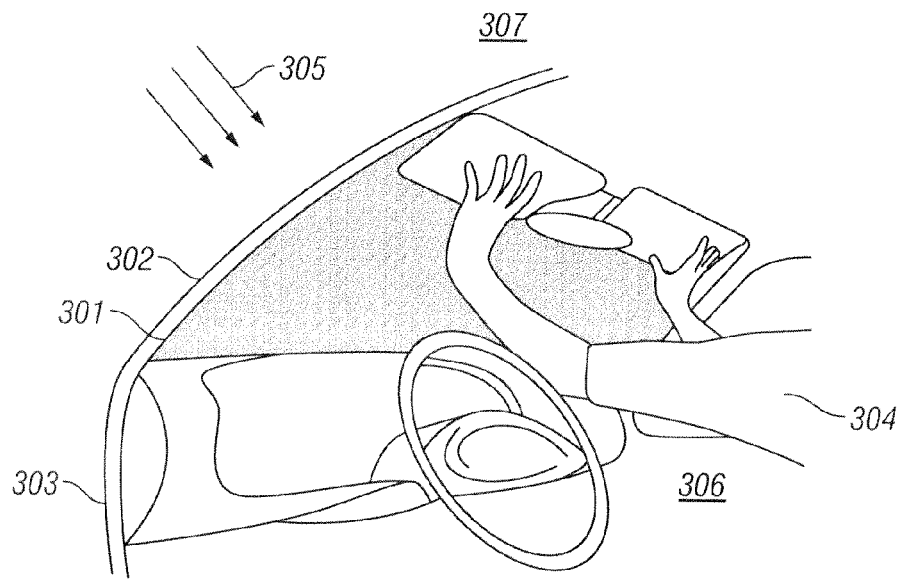
FIG. 3 is a diagram of a solar photo-voltaic panel manually and removably mounted on the front windshield of a vehicle by the vehicle's operator.

FIG. 3 is a diagram of one embodiment of a solar photo-voltaic panel 301 of the present invention that is manually and removably mounted on the front windshield 302 of a vehicle 303, such as a parked automobile, by the vehicle's operator 304. The solar photo-voltaic panel 301 not only blocks the sun's rays 305 from entering the vehicle 303, but also converts the energy of the sun's rays 305 to generate a DC voltage that can be applied to a thermoelectric cooling assembly, as described below, which pumps heat out of the interior 306 of the vehicle 303 into the atmosphere 307.

Figure 4:
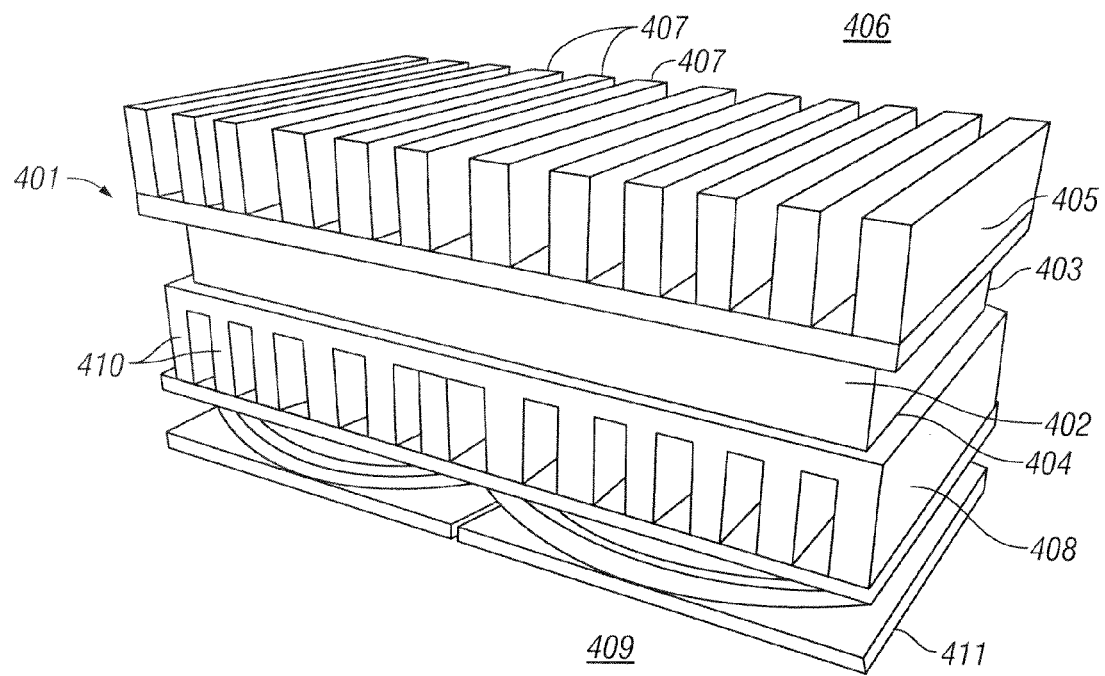
FIG. 4 is a diagram of a thermoelectric cooling assembly.

FIG. 4 is a diagram of a thermoelectric cooling assembly 401. The thermoelectric cooling assembly 401 is powered by a low DC voltage from the removably mounted solar photo-voltaic panel 301. The thermoelectric cooling assembly 401 can include a TEC) 402 with a cold side 403 from which heat is removed and a hot side 404 to which heat is transferred. The thermoelectric cooling assembly 401 can further include an internal heat sink 405 in fixed, thermal contact with the cold side 403 on one side of the internal heat sink 405 and in thermal contact with air 406 in the interior 306 of the vehicle 303 on another side of the internal heat sink fabricated with fins 407. The thermoelectric cooling assembly 401 can include an external heat sink 408 in fixed, thermal contact with the hot side 404 on one side of the external heat sink 408 and in thermal contact with air 409 exterior to the vehicle on another side of the external heat sink fabricated with fins 410.

Heat is transferred from the air 406 in the interior 406 of the vehicle 303 to the air 409 exterior to the vehicle 303 through the various components of the thermoelectric cooling assembly 401. Heat is extracted from the air 406 in the interior 306 of the vehicle 303 by the fins 407 fabricated into the internal heat sink 405. This heat extraction may be improved by placing a fan (not shown) to blow the air 406 in the interior 306 of the vehicle 303 into the fins 407 fabricated into the internal heat sink.

The heat is then transferred from the internal heat sink 405 to the cold side 403 of the TEC 402. From the cold side 403, the heat is pumped to the hot side 404 of the TEC 402. Subsequently, the heat is removed from the hot side 404 by the external heat sink 408 and expelled to the air 409 exterior to the vehicle through the fins 410 fabricated on the external heat sink 408. The transfer of heat from the fins 410 of the external heat sink 408 to the air 409 exterior to the vehicle 303 may be enhanced by a fan 411 connected to the fins 410 fabricated on the external heat sink 408 wherein the fan is configured to blow air on to the fins 410.

The solar photo-voltaic panel-powered thermoelectric cooling assembly has no moving parts except for optional fans, are extremely reliable with an almost unlimited life span and require no maintenance, other than replacement of optional fans. "Static" construction makes thermoelectric cooling assemblies immune to vibration thus allowing them to be used in any orientation and makes them particularly suitable for application on moving systems including ships, aircraft and automobiles, including passenger cars. The thermoelectric cooling assembly does not contain any polluting substances such as chlorofluorocarbons (CFC) or other gases, has a more compact and simple structure than a compressor system, and can also be easily adapted and mounted.

In this embodiment of the thermoelectric cooling assembly 401, the air 409 exterior to the vehicle is the atmosphere 307. Alternatively, for vehicles floating, including docked or anchored, in water, the external heat sink 407 is in thermal contact with water exterior to the vehicle.

Figure 5:
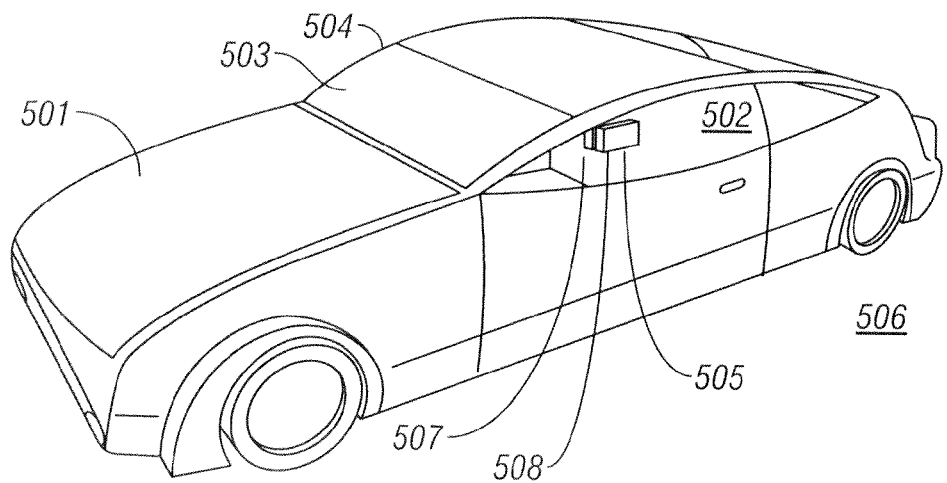
FIG. 5 is a diagram of a vehicle with its interior thermoelectrically cooled.

FIG. 5 is a diagram of a vehicle 501, such as a parked automobile, with its interior 502 thermoelectrically cooled. The solar photo-voltaic panel 503 is removably mounted on the windshield 504 of the vehicle 501. The thermoelectric cooling assembly 505 is removably and manually placed in thermal contact between air in the interior 502 of the vehicle and the air 506 external to the vehicle at another window 507 in the vehicle left slightly open. The direction of heat flow is controlled by the direction of the voltage applied to the TEC 508 inside the thermoelectric cooling assembly 505. The solar photo-voltaic panel 503 can be folded and stored safely before operation of the vehicle 501 requiring viewing through the windshield 504. The apparatus of the solar photo-voltaic panel 503 and thermoelectric cooling assembly 505 can be used by owners of existing vehicles without any retrofitting.

Figure 6:
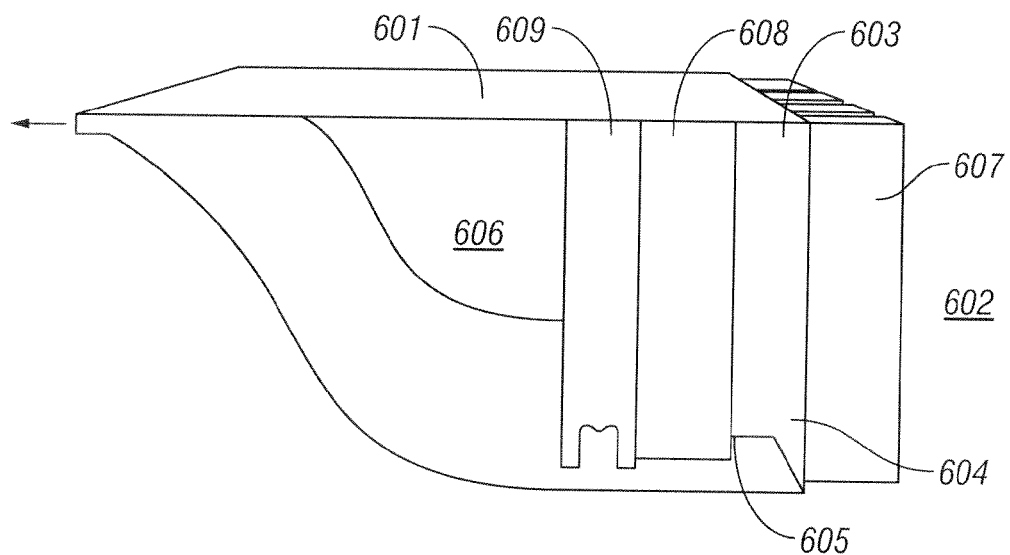
FIG. 6 is a diagram of a casing configured to transfer heat from the air interior to the vehicle to the air exterior to the vehicle.

FIG. 6 is a diagram of a casing 601 configured to transfer heat from the air 602 interior to a vehicle 501, such as a parked automobile, to the air exterior to the vehicle 501. The casing 601 can be a TEC 603 inside the casing comprising a cold side 604 from which heat is removed and a hot side 605 to which heat is transferred. The cold side 604 of the TEC 603 is exposed to air 602 inside the vehicle 501 and the hot side 605 of the TEC 603 is exposed to air 606 exterior to the vehicle 501.

An internal heat sink 607 is in fixed contact with an external surface of the wall of the casing 601 configured to be in thermal contact with the cold side 604 on one side of the internal heat sink 607 and air in the interior of the vehicle on another side of the internal heat sink 607. The internal heat sink 607 may be fabricated with fins (not shown) on its other side to exchange heat from the air 602 interior to the vehicle with the internal heat sink 607. The other side of the internal heat sink 607 may also be connected to a fan (not shown) to enhance heat removal from the air 602 interior to the vehicle.

An external heat sink 608 is in fixed, thermal contact with the hot side 605 on one side of the external heat sink and air outside the vehicle on another side of the external heat sink 608. The other side of the external heat sink 608 may additionally be fabricated with fins (not shown) to exchange heat from the external heat sink 608 and the air surrounding the fins. Moreover, the other side of the external heat sink 608 may be connected to a fan 609 configured to blow air inside the casing on to the other sided of the external heat sink 608 and to facilitate the exchange of the air and heat inside the casing 601 with air 602 external to the vehicle 501.

Figure 7:
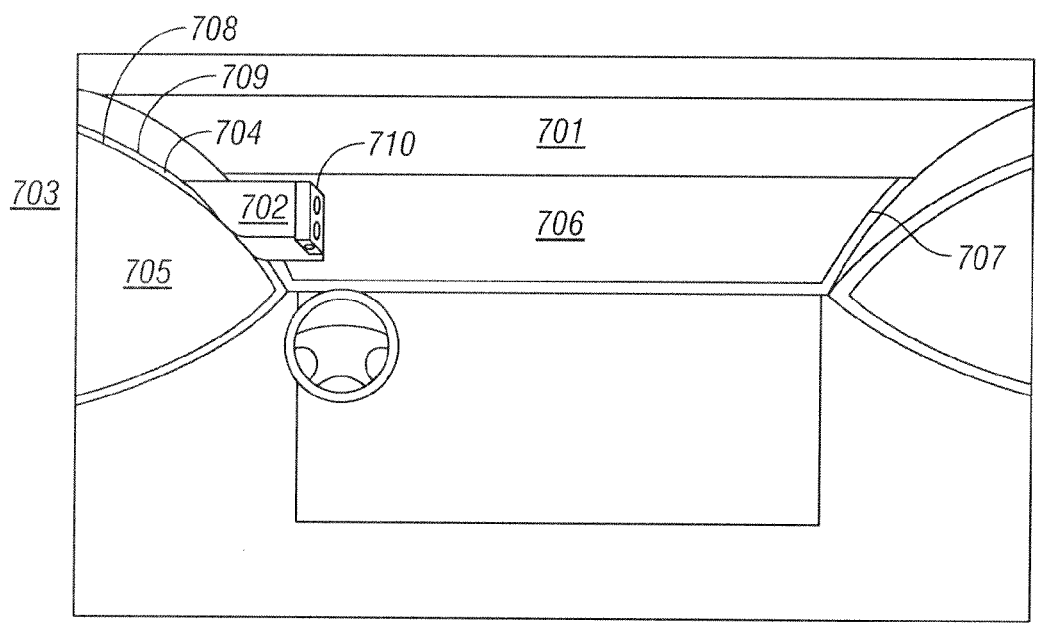
FIG. 7 is a diagram of the interior of a vehicle cooled by the thermoelectric cooling assembly comprising a casing by transferring heat to the air external to the vehicle through a narrow opening of the casing extending through a window slightly ajar.

FIG. 7 is a diagram of the interior 701 of a vehicle 501, such as parked automobile, cooled by the thermoelectric cooling assembly comprising a casing 702 transferring heat to air 703 external to the vehicle 501 through a narrow opening 704 of the casing 702 extending through a window 705 of the vehicle slightly ajar. The solar photo-voltaic panel 706 used to provide a low DC voltage to the thermoelectric cooling assembly is removably mounted on the windshield 707 of the vehicle 501. Below the windshield 707 are shown various controls for the vehicle 501. To prevent air leaking from the interior 701 of the car to the exterior of the car, a removable, sealing grommet 708 is placed in the area bounded by the top of the window 705 and the exposed frame 709. The window 705 may be a window of a door of a parked automobile.

Additionally, the casing may be configured to have a fan 710 to facilitate cooling the interior 701 of the vehicle 501 with the thermoelectric cooling assembly comprising the casing 702. The solar photo-voltaic panel 706, the casing 702 and the removable, sealing grommet 708 can be manually installed by the vehicle operator without any retrofitting of the vehicle.

While the present invention has been described in connection with a number of embodiments and implementations, the present invention is not so limited but covers various obvious modifications and equivalent arrangements, which fall into the purview of the appended claims.

What is claimed is:

1. An apparatus for cooling an interior of a vehicle comprising:
a solar photo-voltaic panel removably positioned on an inside of a window or a windshield of the vehicle to block at least a portion of sun rays from entering the vehicle and configured to convert energy from the sun rays to generate a DC voltage; and a thermoelectric cooling assembly powered by the DC voltage;
wherein the thermoelectric cooling assembly comprises a casing having a thermoelectric module having a cold side exposed to air in the interior of the vehicle and a hot side exposed by a narrow opening in the casing to air exterior of the vehicle, the thermoelectric module adapted to transfer heat from the air in the interior of the vehicle to the air exterior of the vehicle;
wherein there is substantially no flow of air through the thermoelectric cooling assembly from the interior to the exterior of the vehicle; and
wherein the narrow opening in the casing is adapted to be positioned in a narrow opening between a top of a vehicle window and a frame of the vehicle; and
wherein the apparatus further comprises a sealing grommet adapted to be positioned in the narrow opening between the top of the vehicle window and the frame of the vehicle.

2. The apparatus of claim 1, wherein the thermoelectric cooling assembly further comprises an internal heat sink in thermal contact with the cold side and in direct thermal contact with air in the interior of the vehicle; and an external heat sink in thermal contact with the hot side and in direct thermal contact with the air exterior to the vehicle.

3. The apparatus of claim 2, wherein the external heat sink is in fixed contact with the hot side; and wherein the external heat sink is exposed to a fan powered by the DC voltage, the fan configured to blow air on the external heat sink.

4. The apparatus of claim 2, wherein the internal heat sink is in fixed, thermal contact with the cold side; and wherein the internal heat sink is exposed to a fan powered by the DC voltage, the fan configured to blow air from inside the vehicle.

5. The apparatus of claim 2, wherein the internal heat sink includes fins to exchange heat from the interior of the vehicle with the internal heat sink, and wherein the external heat sink includes fins to exchange heat from the external heat sink to the air exterior to the vehicle.

6. The apparatus of claim 5, wherein the external heat sink is exposed to a fan powered by the DC voltage, the fan configured to blow air inside the casing.

7. The apparatus of claim 1, wherein the vehicle is a parked automobile.

8. The apparatus of claim 7, wherein the solar photovoltaic panel is configured to be positioned on a front windshield of the parked automobile.

9. The apparatus of claim 7, wherein the solar photovoltaic panel is configured to be positioned on a back windshield of the parked automobile.

10. The apparatus of claim 1, wherein the vehicle is a docked or anchored boat.

11. The apparatus of claim 1, wherein the vehicle is a grounded or floating aircraft.

12. The apparatus of claim 1, wherein the solar photo-voltaic panel removably positioned on an inside of a window or a windshield of the vehicle is adapted to be removed from the window or the windshield prior to operation of the vehicle.

13. A method for an interior of a vehicle comprising:
positioning a solar photo-voltaic panel on an inside of a window or a windshield of the vehicle, converting at least a portion of the energy from sun rays with the solar photo-voltaic panel to generate a DC voltage; and powering at least a portion of a thermoelectric cooling assembly with the DC voltage,
wherein the thermoelectric cooling assembly comprises a casing having a narrow opening and a thermoelectric module having a cold side and a hot side; and
wherein the method further comprises:
positioning a sealing grommet in a narrow opening between the top of a vehicle window and a frame of the vehicle; and positioning the narrow opening of the casing in a narrow opening between the top of a vehicle window and a frame of the vehicle in contact with the sealing grommet;

exposing the hot side of the thermoelectric module through the narrow opening in the casing to air exterior of the vehicle;

exposing the air in the interior of the vehicle to the cold side of the thermoelectric module to cool the air in the interior; and transferring heat from the air in the interior of the vehicle to the air exterior of the vehicle through the thermoelectric module;

wherein while the method is practiced there is substantially no flow of air through the thermoelectric cooling assembly from the interior to the exterior of the vehicle.

14. The method of claim 13, wherein transferring heat from the air in the interior of the vehicle to the air exterior of the vehicle through the thermoelectric module comprises pumping heat from the cold side to the hot side of the thermoelectric module.

15. The method of claim 14, further comprising: removing heat from the hot side by an external heat sink; and expelling the heat to an exterior of the vehicle.

16. The method of claim 14, wherein the thermoelectric cooling assembly further includes an internal heat sink with fins and an external heat sink, wherein exposing the air in the interior of the vehicle to the cold side of the thermoelectric module is practiced using the fins of the internal heat sink, and wherein exposing the hot side of the thermoelectric module through the narrow opening in the casing to air exterior of the vehicle is practiced with the external heat sink.

17. The method of claim 16, further comprising: blowing air in the interior of the vehicle into the fins.

18. The method of claim 13, further comprising: directing heat flow in the vehicle by a direction of the DC voltage applied to the thermoelectric module.

19. The method of claim 13, wherein the method further comprises removing the solar photo-voltaic panel from the inside of the window or the windshield of the vehicle prior to operation of the vehicle.

20. The method of claim 13, wherein the method further comprises removing the thermoelectric cooling assembly from the vehicle window.

21. A method for cooling an interior of a vehicle comprising:

removably positioning a solar photo-voltaic panel on the inside of a window or windshield of the vehicle; thermoelectrically cooling the interior of the vehicle using a thermoelectric cooling assembly powered by a DC voltage from the removably positioned solar photo-voltaic panel, the thermoelectric cooling assembly including, a thermoelectric module having a cold side and a hot side, an internal heat sink in thermal contact with the cold side and in thermal contact with air in the interior of the vehicle; an external heat sink in thermal contact with the hot side and in thermal contact with an exterior of the vehicle; using the cold side of the thermoelectric cooler to remove heat from the interior of the vehicle; transferring the heat from the interior of the vehicle to the hot side of the thermoelectric module; and using the external heat sink to remove heat from the hot side of the thermoelectric module to the exterior of the vehicle;

wherein the thermoelectric cooling assembly further comprises a casing having a narrow opening; and wherein the method further comprises:

positioning the narrow opening of the casing in a narrow opening between a top of a vehicle window and a frame of the vehicle;

positioning a sealing grommet in the narrow opening between the top of the vehicle window and the frame of the vehicle;

exposing the external heat sink of the hot side of the thermoelectric cooling assembly through the narrow opening in the casing to air from the exterior of the vehicle;

exposing the internal heat sink of the cold side of the thermoelectric cooler assembly to air in the interior of the vehicle to cool the air in the interior; and transferring heat from the air in the interior of the vehicle to the air exterior of the vehicle through the thermoelectric module;

wherein while the method is practiced there is substantially no flow of air through the thermoelectric cooling assembly from the interior to the exterior of the vehicle.

22. The method of claim 21, wherein the vehicle is a parked automobile.

23. The method of claim 22, wherein the solar photovoltaic panel is positioned on the front windshield of the parked automobile.

24. The method of claim 22, wherein the solar photovoltaic panel is positioned on the back windshield of the parked automobile.

25. The method of claim 22, further comprising: blowing air external to the parked automobile on to the external heat sink, wherein the external heat sink is in fixed contact with the hot side.

26. The method of claim 22, further comprising: blowing air inside the parked automobile on to the internal heat sink, wherein the internal heat sink is in fixed contact with the cold side.

27. The method of claim 22, wherein the internal heat sink is fabricated with fins, and wherein the external heat sink is fabricated with fins and wherein the method further comprises:

exchanging heat from the interior of the vehicle with the fins of the internal heat sink; and exchanging heat from the fins of the external heat sink with air exterior of the vehicle.

28. The method of claim 21, wherein the method further comprises removing the solar photo-voltaic panel from the inside of the window or the windshield of the vehicle prior to operation of the vehicle.

29. The method of claim 21, wherein the method further comprises removing the thermoelectric cooling assembly from the vehicle window.

* * * * *